3,809,671
METHOD FOR ANTIBLOCKING HIGH PRESSURE PROCESS POLYETHYLENE FILM
Sohei Okawa and Shuhei Doi, Yokkaichi, Japan, assignors to Mitsubishi Petrochemical Co., Ltd., Tokyo, Japan
No Drawing. Filed Aug. 10, 1972, Ser. No. 279,319
Claims priority, application Japan, Sept. 14, 1971, 46/71,995
Int. Cl. C08f 45/04
U.S. Cl. 260—41 R                    2 Claims

ABSTRACT OF THE DISCLOSURE 0.01–2% by weight calcium sulfate having an average particle size of 1–10$\mu$ is used as an antiblocking agent for high pressure process ethylene polymer films.

BACKGROUND OF THE INVENTION

Field of the invention

This invention relates to a method for antiblocking of a film of high pressure process ethylene homopolymer or copolymer containing more than 70% by weight of ethylene.

Description of prior art

Conventional polyolefin films, particularly those prepared from low density polyethylene, or ethylene copolymers containing greater than 70% by weight ethylene, are generally characterized by disadvantageously high blocking tendencies. By the term "blocking," of course, is meant the tendency of a film to adhere to itself.

Heretofore, it had been proposed to reduce the blocking tendency of films by incorporating into the film an inorganic filler such as silica powder. Silica powder has been primarily used for this purpose since it is readily available and can easily be obtained in a narrow particle size distribution. Moreover, it is easy to obtain silica in purities as high as 98%, and its affinity for synthetic resins is quite high. The use of silica, however, is not completely desirable since it tends to adversely affect the transparency of the films and it tends to cause white marring of the film when the film is subjected to frictional stresses.

It was thought to increase the transparency of the polyethylene material used in the film, in an attempt to offset the decreased transparency caused by the silica. That technique, however, has not proven to be a completely satisfactory solution to the problem, since it increased the cost of the film.

Although calcium sulfate had been considered as a filler for polyolefin films, its use tends to produce a white, opaque product, even if the surface of the calcium sulfate is modified to increase its affinity for the polyolefin. Moreover, it has not heretofore been considered to use calcium sulfate as an antiblocking agent for polyolefin film.

SUMMARY OF THE INVENTION

Accordingly, it is one object of this invention to provide a method for antiblocking a high pressure process polyethylene or ethylene copolymer film wherein transparency is not appreciably decreased and the frictional difficulties are minimized, and wherein the cost of the film is not significantly increased.

These and other objects of this invention, as will hereinafter become more readily understood, have been attained by antiblocking a film of high pressure process ethylene polymer, i.e., ethylene homopolymer or ethylene copolymer containing greater than 70% by weight ethylene component, by kneading the ethylene polymer with 0.01–2% by weight of calcium sulfate powder having a particle size substantially of from 0.1 to 15$\mu$, preferably 1–10$\mu$, and most preferably 2–4$\mu$, and forming a film thereof.

DETAILED DESCRIPTION OF THE PREFERRED EMBODIMENT

The characteristic feature of this invention is to use calcium sulfate as an antiblocking agent for high pressure process ethylene polymer film. The use of calcium sulfate as an antiblocking agent is completely different from that as a filler, because the function and result are quite different.

The calcium sulfate powder used in this invention can be calcium sulfate ½ hydrate, calcium sulfate anhydrite or calcium sulfate 2 hydrate. The ½ hydrate is preferred. It is preferable to use high purity calcium sulfate powder, which contains no poisonous impurities, such as arsenic, which is occasionally present in commercially available calcium sulfate. The calcium sulfate used can be obtained from natural sources or as a byproduct from the manufacture of phosphoric acid. It can be powdered by crushing or sedimentation. The approximate state of hydration of the calcium sulfate can be obtained by controlling the degree of drying and heating. The particle size of the calcium sulfate is quite important, for if the average particle size (diameter) of the calcium sulfate powder is less than 1$\mu$, the compatibility with the high pressure process ethylene polymer will not be good. On the other hand, if the average particle size is greater than 10$\mu$, or if particles of greater than 10$\mu$ particle size predominate, the antiblocking functions of the calcium sulfate will be quite decreased and the appearance and the optical properties of the film will be remarkably decreased. Calcium sulfate powder having an average particle size of 2–4$\mu$ will impart especially good antiblocking properties.

Although it is generally easy to crush calcium sulfate to form a fine powder having an average particle size of 2–5$\mu$, since calcium sulfate has a tendency to agglomerate, it is difficult to crush it into a fine powder having a narrow particle size distribution. If the particles are too large, the calcium sulfate will not demonstrate adequate antiblocking properties.

The antiblocking effect can be increased by using a powder having a particle size of 0.1–15$\mu$ and preferably 2–4$\mu$ and having a sharp or narrow distribution of particle size.

The calcium sulfate powder should be used in an amount within the range of 0.1–2% by weight, preferably less than 1% by weight based on the high pressure process ethylene polymer.

When a thin film having a thickness of $10\mu$ is being prepared, it is preferable to use 0.1–0.2% by weight of the calcium sulfate powder. When a rather thick film, such as 1 mm. thickness, is being prepared, it is preferable to use 0.5–1.0% by weight of calcium sulfate powder.

As should be clear to one of ordinary skill in the art, these amounts of calcium sulfate powder specified herein are well outside the range of amounts ordinarily used as a filler.

The high pressure process ethylene polymer used herein includes the homopolymers or copolymers of ethylene containing at least 70% by weight of ethylene. For instance, suitable copolymers include ethylenevinyl acetate copolymer, ethylene-acrylate copolymer, ethylene-vinyl chloride copolymer, etc.

The calcium sulfate can be admixed with the ethylene polymer by any conventional means, such as slurry, direct mixing, or master batch mixing techniques.

In one example of a slurry method, an amide, an antioxidant, or other additive, such as a stabilizer, coloring material, or the like, are dissolved in a mixture of methanol and the calcium sulfate having a particle size of $1-10\mu$, preferably $2-4\mu$, in narrow particle size distribution, is suspended in the solution. The resulting suspension is added to a high pressure process polyethylene base on a roller mill or in a kneader and the mixture is kneaded and pelletized for use in forming a film.

In one example of direct mixing method, the calcium sulfate powder is kneaded with high pressure process polyethylene on a roller mill. Upon kneading, there is a tendency for the calcium sulfate to be distributed such that a higher concentration will appear at the film surface during subsequent melt extrusion in formation of the film. The film can be formed by any conventional method, such as blowing, use of a T-die or by sheet extrusion. It is quite important for the calcium sulfate to be distributed near the surface of the film, since its effect as an antiblocking agent is a surface phenomenon.

The antiblocking characteristics of calcium sulfate is considered to be due to a synergistic relationship existing between the calcium sulfate and the high pressure process polyethylene, which affects the antielectrostatic characteristics of the film. In fact, it was quite unexpected that the use of calcium sulfate powder would result in such a low volume resistivity and a specific dielectric constant of 1.

These results are remarkably different from that obtained by the use of silica or calcium carbonate as antiblocking agents, wherein the volume resistivity is quite high and the specific dielectric constant is 3.3 for silica and 4.8 for calcium carbonate.

Polyolefin films containing the calcium sulfate powder according to this invention are generally characterized by excellent transparency, almost the same as if no antiblocking agent were contained therein, and the white mar phenomenon, which frequently occurs when silica is used, does not occur with calcium sulfate. The calcium sulfate powder can be easily admixed into the high pressure process polyethylene. Moreover, the electrostatic charge of the resulting film will not be increased and the specific dielectric constant will be 1, which is the same as electrically conductive material. The volume resistivity will be quite low.

Calcium sulfate is characterized by a hardness of about 2 (Mohs' scale), as compared with a hardness for silica powder of about 7, and a hardness for calcium carbonate of about 3. Accordingly, it tends to do less damage to the ethylene polymer film upon being subjected to frictional stresses and hence does not cause marring as do other conventional antiblocking agents.

Having now generally described the invention, a further understanding can be attained by reference to certain specific examples, which are provided herein for purposes of illustration only and are not intended to be limiting in any manner unless otherwise specified.

EXAMPLE 1

Polyethylene resin pellets having a specific gravity of 0.924 and a melt index (hereinafter referred to as MI) of 2.0, prepared by the high pressure process, were used in the test. The polyethylene resin was heat melted at 200–250° C. on a heat roller mill. The following slurry containing the antiblocking agent, the antioxidant, and the stabilizer was added to the melt resin to remove the organic solvent by evaporation. The mixture was kneaded in an extruder and was cut to prepare resin pellets which can be used for preparation of films.

The slurry contained 0.1 part by weight of the antiblocking agent, 0.05 part by weight of the antioxidant, 0.08 part by weight of the oleic amide, and 0.02 part by weight of stearic amide in methanol. This slurry was added to 97.5 parts by weight of the resin. A film having a thickness of $30\mu$ was formed from the pellets by use of an inflation film extruder.

The inflation film formation was carried out at a temperature of 160° C. for the resin, 30° C. for the blower air, 33° C. for the nip roller. The blow ratio was 1.5 and the take-up velocity was 20 m./min. A film extruder having a diameter of 40 mm. and a die diameter of 100 mm. was used. The resulting film samples were evaluated by the following tests.

Appearance: The color of the films was observed.

White mar: The white mar caused by the inter-friction of film on film was observed. ((+) mar easily formed.)

Electrostatic property: 10 kv. of charge was impressed on the film surface for 3 minutes. The discharge rate of the charge from the film surface was measured by use of an electrostatic attenuation tester (percent).

Transparent properties:

gloss: ASTM method D–523–67 (percent)
cloudiness: ASTM method D–1003–52 (percent)
transparency: the light transmitted through the film was measured by a galvanometer. The value shown is compared with a standard plate designated as 18.

Blocking properties:

opening property: the opening property of the film tube was measured by finger pressure. 1.0 designates film opening without pressure. 6.0 designates a film which cannot be opened by finger pressure.

Blocking property without aging:

the force required for separating one film measuring 20 mm. x 50 mm. from another after being in mutual contact for 1 day (g./10 cm.²).

Blocking property after aging:

after leaving one day from the film formation, the film was plied and pressed at 40° C. for 24 hours under the pressure of 50 g./cm.². The force required for separating one film measuring 20 mm. x 50 mm. from another after being maintained in mutual contact for one day under pressure, at a temperature of 40° C. g./10 cm.²).

Friction: ASTM–D–1894 statical friction coefficient was measured.

The results of these tests are shown in Table I. For comparative purposes, the same tests are shown with relation to use of silica, calcium carbonate, aluminum silicate, and magnesium silicate as antiblocking agents.

Table I

| Characteristics | Tests | Unit | Silica SiO₂ | Calcium sulfate CaSO₄·2H₂O | (*) | CaSO₄·1/2H₂O | (*) | Calcium carbonate (*) | (*) | Magnesium silicate (*) |
|---|---|---|---|---|---|---|---|---|---|---|
| Appearance | Color | | White | White | ○ | White | ○ | White ○ | Yellow X | White ○ |
| White mar | White mar | | Plus | | ◎ | | ◎ | ◎ | ◎ | ◎ |
| Electrostatic property | Attenuation | Percent | 13 | 15 | ○ | 14 | ○ | 11.0 X | 10.5 X | 13 ○ |
| Blocking property | Blocking without aging | G./10 cm² | 130 | 125 | ○ | 125 | ○ | 135 ○ | 133 ○ | 140 ○ |
| Friction | Statical friction | | 0.07 | 0.07 | ○ | 0.07 | ○ | 0.08 ○ | 0.07 ○ | 0.07 ○ |
| Transparency | Gloss | Percent | 98 | 100 | ○ | 101 | ○ | 103 ○ | 100 ○ | 100 ○ |
| | Cloudiness | Percent | 7.0 | 6.6 | ◎ | 6.5 | ◎ | 6.4 ◎ | 6.5 ◎ | 7.3 ○ |
| | Transparency | | 14.7 | 10.0 | ◎ | 9.5 | ◎ | 10.5 ◎ | 9.0 ◎ | 15.0 ○ |
| Total evaluation | | | ○ | | ◎ | | ◎ | X | X | ○ |

*Rank: ○=standard quality; X=inferior; ◎=superior.

EXAMPLE 2

A film was prepared in accordance with Example 1 using the same polyethylene resins and calcium sulfate powder as an antiblocking agent.

For reference purposes, another film was prepared by the same process, except replacing the calcium sulfate powder with various amounts of silica powder. The evaluation tests of the films were made by the same methods. The results are shown in Table II together with the results obtained using films containing silica powder.

TABLE II

| Characteristics | Tests | Unit | Silica (SiO₂) 0.05% | 0.10% | 0.2% | None | Calcium sulfate (CaSO₄·1/2H₂O) 0.05% | (*) | 0.10% | (*) | 0.2% | (*) |
|---|---|---|---|---|---|---|---|---|---|---|---|---|
| White mar | White mar | | Plus | Plus | Plus | | | ◎ | | ◎ | | ◎ |
| Transparency | Gloss | Percent | 105 | 98 | 90 | 105 | 105 | ○ | 101 | ○ | 90 | ○ |
| | Cloudiness | do | 6.6 | 7.0 | 8.0 | 5.6 | 5.8 | ◎ | 6.5 | ◎ | 7.6 | ◎ |
| | Transparency | | 9.9 | 14.7 | 20.0 | 6.5 | 7.5 | ◎ | 9.5 | ◎ | 18.0 | ◎ |
| Blocking property | Opening test | | 3 | 2.5 | 1 | 6.0 | 3 | ○ | 2.5 | ○ | 1 | ○ |
| | Blocking without aging | G./10 cm² | 190 | 130 | 0 | 250 | 190 | ○ | 125 | ○ | 0 | ○ |
| | Blocking after aging | G./10 cm² | 280 | 220 | 100 | 860 | 270 | ○ | 220 | ○ | 100 | ○ |
| Friction | Statical friction | | 0.07 | 0.07 | 0.07 | 0.07 | 0.07 | ○ | 0.07 | ○ | 0.07 | ○ |
| Total evaluation | | | ○ | ○ | ○ | | | ◎ | | ◎ | | ◎ |

*Rank: ○=standard quality; ◎=superior.

EXAMPLE 3

Films of 20μ, 30μ or 60μ in thickness were respectively prepared in accordance with Example 1 using the same polyethylene resin. The results are shown in Table III together with the results obtainable with films containing silica powder.

TABLE III

| Characteristics | Tests | Unit | Silica SiO₂ 20μ | 30μ | 60μ | Calcium sulfate 20μ | (*) | 30μ | (*) | 60μ | (*) |
|---|---|---|---|---|---|---|---|---|---|---|---|
| White mar | White mar | | Plus | Plus | Plus | | ◎ | | ◎ | | ◎ |
| Transparency | Gloss | Percent | 92 | 98 | 118 | 92 | ○ | 101 | ○ | 120 | ○ |
| | Cloudiness | do | 7.5 | 7.0 | 5.7 | 7.5 | ◎ | 6.5 | ◎ | 5.5 | ◎ |
| | Transparency | | 15.8 | 14.7 | 13.5 | 10.5 | ◎ | 9.5 | ◎ | 8.0 | ◎ |
| Blocking property | Opening test | | 2.5 | 2.5 | 3.5 | 2.5 | ○ | 2.5 | ○ | 3.5 | ○ |
| | Blocking without aging | G./10 cm² | 60 | 130 | 340 | 60 | ○ | 125 | ○ | 340 | ○ |
| | Blocking after aging | G./10 cm² | 120 | 220 | 420 | 120 | ○ | 220 | ○ | 420 | ○ |
| Friction | Statical friction | | 0.07 | 0.07 | 0.07 | 0.07 | ○ | 0.07 | ○ | 0.07 | ○ |
| Total evaluation | | | ○ | ○ | ○ | | ◎ | | ◎ | | ◎ |

*Rank: ○=standard quality; ◎=superior.

EXAMPLE 4

The films were prepared in accordance with Example 1 using an ethylene-vinyl acetate copolymer having a density of 0.927 and a melt index of 0.50 (vinyl acetate content is 10%) and various amounts of the calcium sulfate powder as an antiblocking agent. The resin was heated to 180° C. A film was formed at a blow rate of 1.0.

Evaluation tests of the films were made using the same methods. The results are shown in Table IV together with the results using films containing silica powder.

Having now fully described the invention, it will be apparent to one of ordinary skill in the art that many changes and modifications can be made thereto without departing from the spirit or scope of the invention as set forth herein.

Accordingly:

What is claimed and intended to be secured by Letters Patent is:

1. A high pressure process film of ethylene polymer containing greater than 70% ethylene, characterized by good antiblocking properties which comprises 0.01–2% by weight of calcium sulfate powder having an average particle size of 1–10$\mu$ being admixed into said film.

2. The film of claim 1, wherein said calcium sulfate is calcium sulfate ½ hydrate having a hardness of about 2.

TABLE IV

| Characteristics | Tests | Unit | Silica (SiO$_2$) | | | Calcium sulfate | | | | | |
|---|---|---|---|---|---|---|---|---|---|---|---|
| | | | 0.5% | 1.0% | 2.0% | 0.5% | (*) | 1.0% | (*) | 2.0% | (*) |
| White mar | White mar | | Plus | Plus | Plus | | ◎ | | ◎ | | ◎ |
| Transparency | Gloss | Percent | | | | | | | | | |
| | Cloudiness | do | 22.3 | 33.3 | 58.5 | 20 | ◎ | 30 | ◎ | 56 | ◎ |
| | Transparency | | | | | | | | | | |
| Blocking property | Opening test | | 3.5 | 2.5 | 1.5 | 3.5 | ○ | 2.5 | ○ | 1.5 | ○ |
| | Blocking without aging | G./10 cm.$^2$ | 300 | 100 | 0 | 300 | ○ | 100 | ○ | 0 | ○ |
| | Blocking after aging | G./10 cm.$^2$ | 500 | 100 | 0 | 500 | ○ | 100 | ○ | 0 | ○ |
| Friction | Statical friction | | 0.3 | 0.27 | 0.24 | 0.30 | ○ | 0.27 | ○ | 0.24 | ○ |
| Total evaluation | | | ○ | ○ | ○ | | ◎ | | ◎ | | ◎ |

*Rank: ○ =standard quality; ◎ =superior.

EXAMPLE 5

Films were prepared in accordance wtih Example 1 using an ethylene-vinyl acetate copolymer having a density of 0.939, a melt index of 2.0 (vinyl acetate content is 20%) and 0.15% of the calcium sulfate powder as an antiblocking agent. The film was formed to a thickness of 0.05 mm. at a resin temperature of 150° C. The evaluation tests of the films were made by the same methods. The results are shown in Table V together with the results using films containing silica powder (0.15%).

TABLE V

| Characteristics | Tests | Unit | Silica SiO$_2$ | Calcium sulfate CaSO$_4$1/2H$_2$O | (*) |
|---|---|---|---|---|---|
| White mar | White mar | | | | ◎ |
| Transparency | Gloss | Percent | | | ◎ |
| | Cloudiness | do | 2.3 | 1.8 | ◎ |
| | Transparency | | 14.2 | 12.0 | ○ |
| Blocking property | Opening test | | 5.5 | 5.5 | ○ |
| | Blocking without aging | G./10 cm.$^2$ | 470 | 470 | ○ |
| | Blocking after aging | G./10 cm.$^2$ | | | ○ |
| Friction | Statical friction | | <1.0 | <1.0 | ○ |
| Total evaluation | | | ○ | ◎ | |

*Rank: ○ =standard quality; ◎ =superior.

References Cited
UNITED STATES PATENTS

| | | | |
|---|---|---|---|
| 3,201,506 | 8/1965 | Bills | 264—210 |
| 2,956,035 | 10/1960 | Mock | 260—23 |
| 3,553,302 | 1/1971 | Susuki et al. | 264—49 |
| 3,687,890 | 8/1972 | Susuki et al. | 260—41 R |
| 3,374,199 | 3/1968 | Ross et al. | 260—41 |

MORRIS LIEBMAN, Primary Examiner

J. H. DERRINGTON, Assistant Examiner

U.S. Cl. X.R.

260—42.52; 264—211